July 7, 1942.    J. LUNDGREN    2,289,200
APPARATUS FOR BALANCING ROTATABLE BODIES
Filed Sept. 1, 1939    6 Sheets-Sheet 1

INVENTOR
Jacob Lundgren
BY
Herbert S. Fairbanks
ATTORNEY

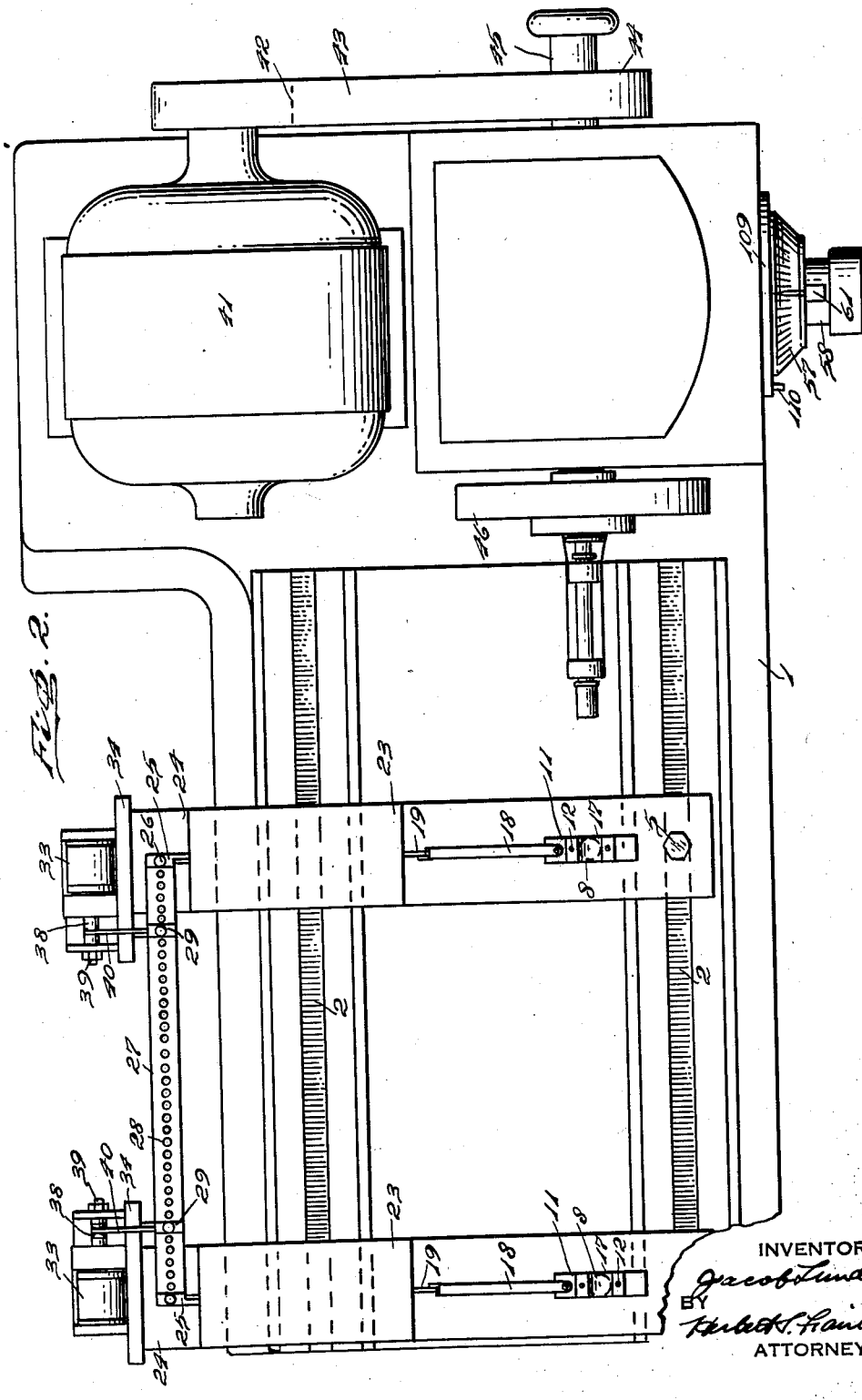

July 7, 1942.   J. LUNDGREN   2,289,200
APPARATUS FOR BALANCING ROTATABLE BODIES
Filed Sept. 1, 1939   6 Sheets-Sheet 3
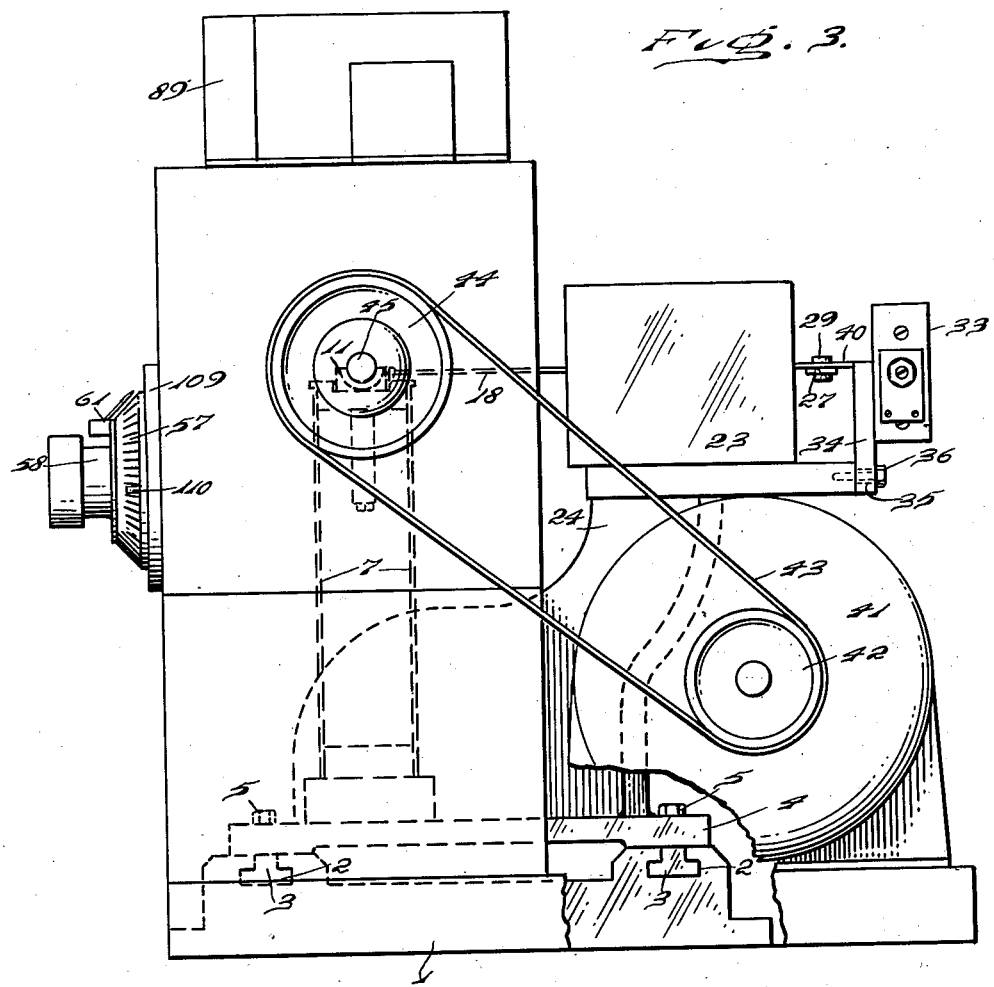
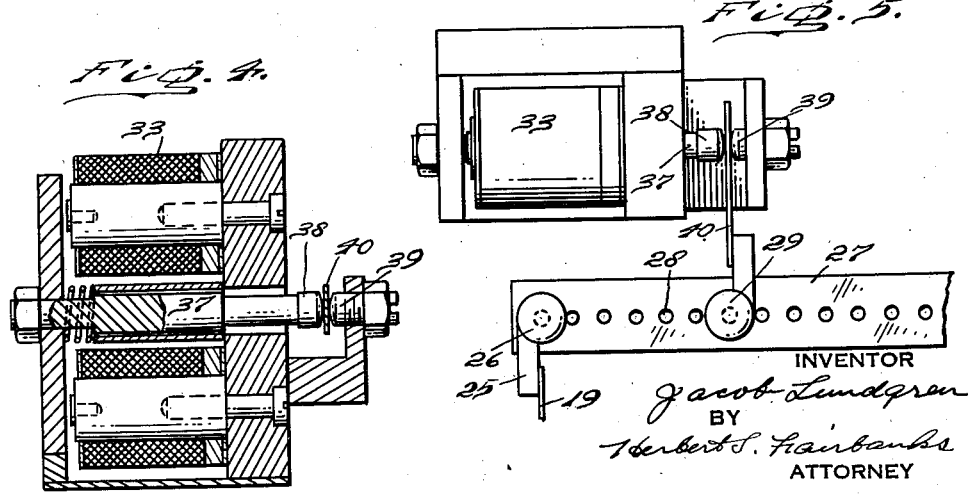
INVENTOR
Jacob Lundgren
BY
Herbert S. Fairbanks
ATTORNEY July 7, 1942.  J. LUNDGREN  2,289,200
APPARATUS FOR BALANCING ROTATABLE BODIES
Filed Sept. 1, 1939   6 Sheets-Sheet 4
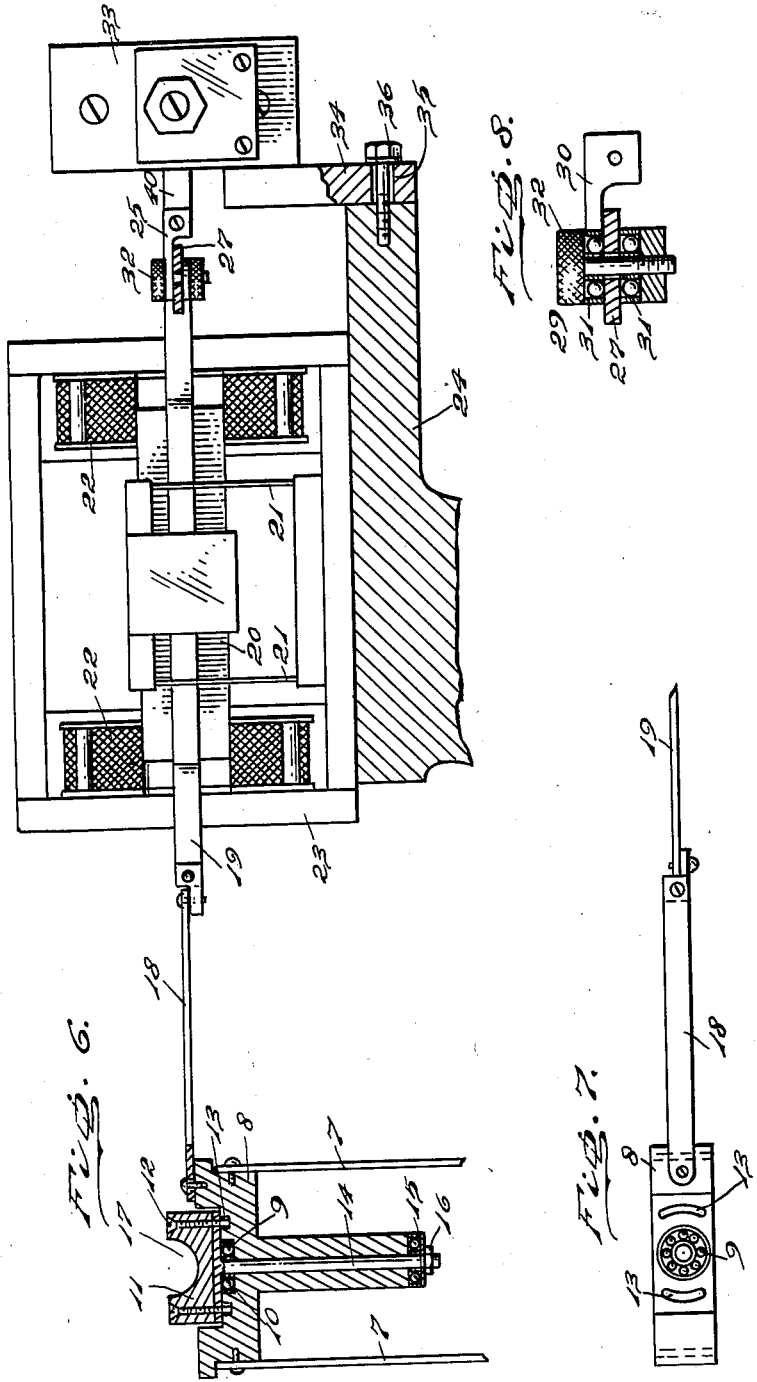
INVENTOR
Jacob Lundgren
BY
Herbert P. Fairbanks
ATTORNEY

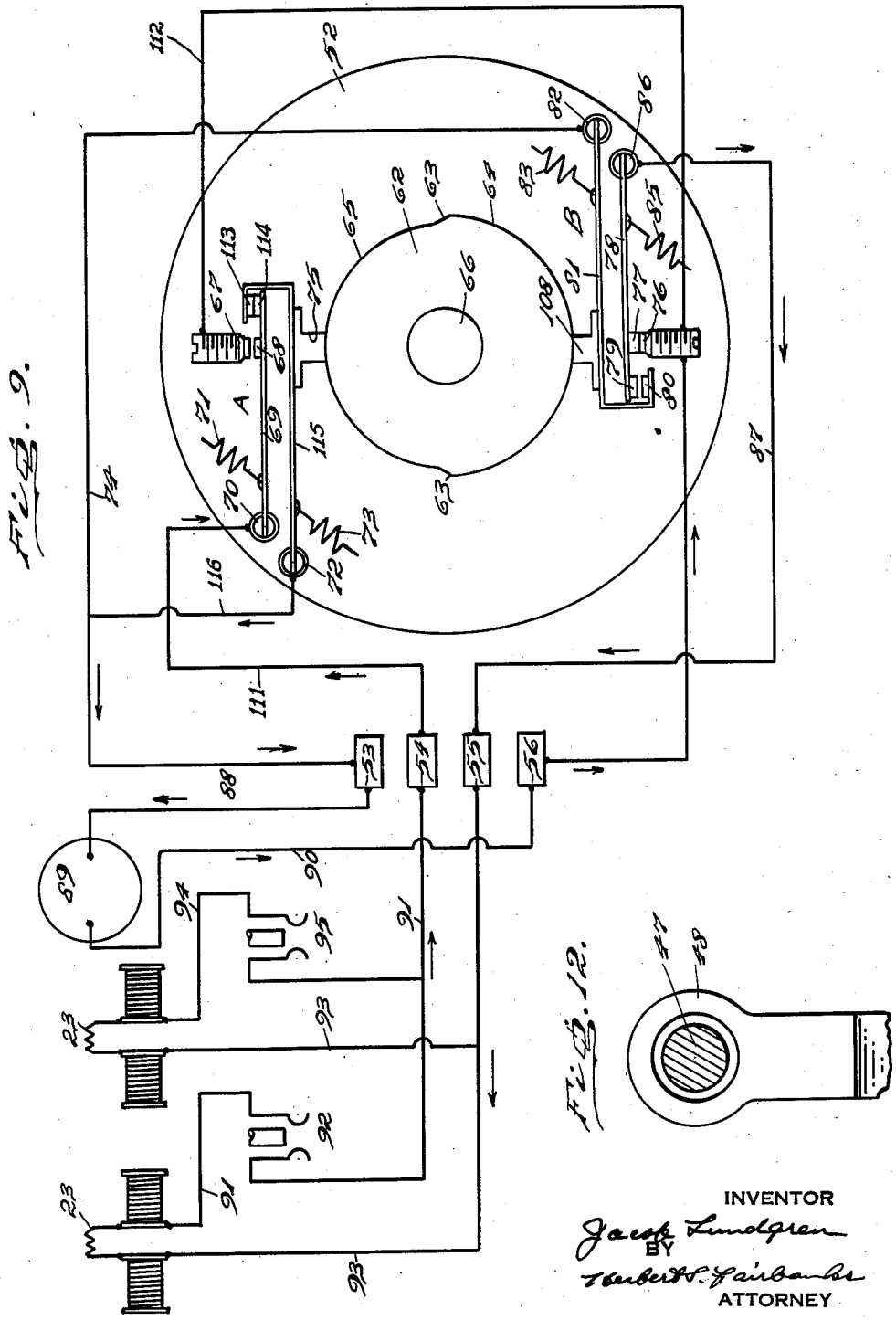

July 7, 1942. J. LUNDGREN 2,289,200
APPARATUS FOR BALANCING ROTATABLE BODIES
Filed Sept. 1, 1939 6 Sheets-Sheet 6
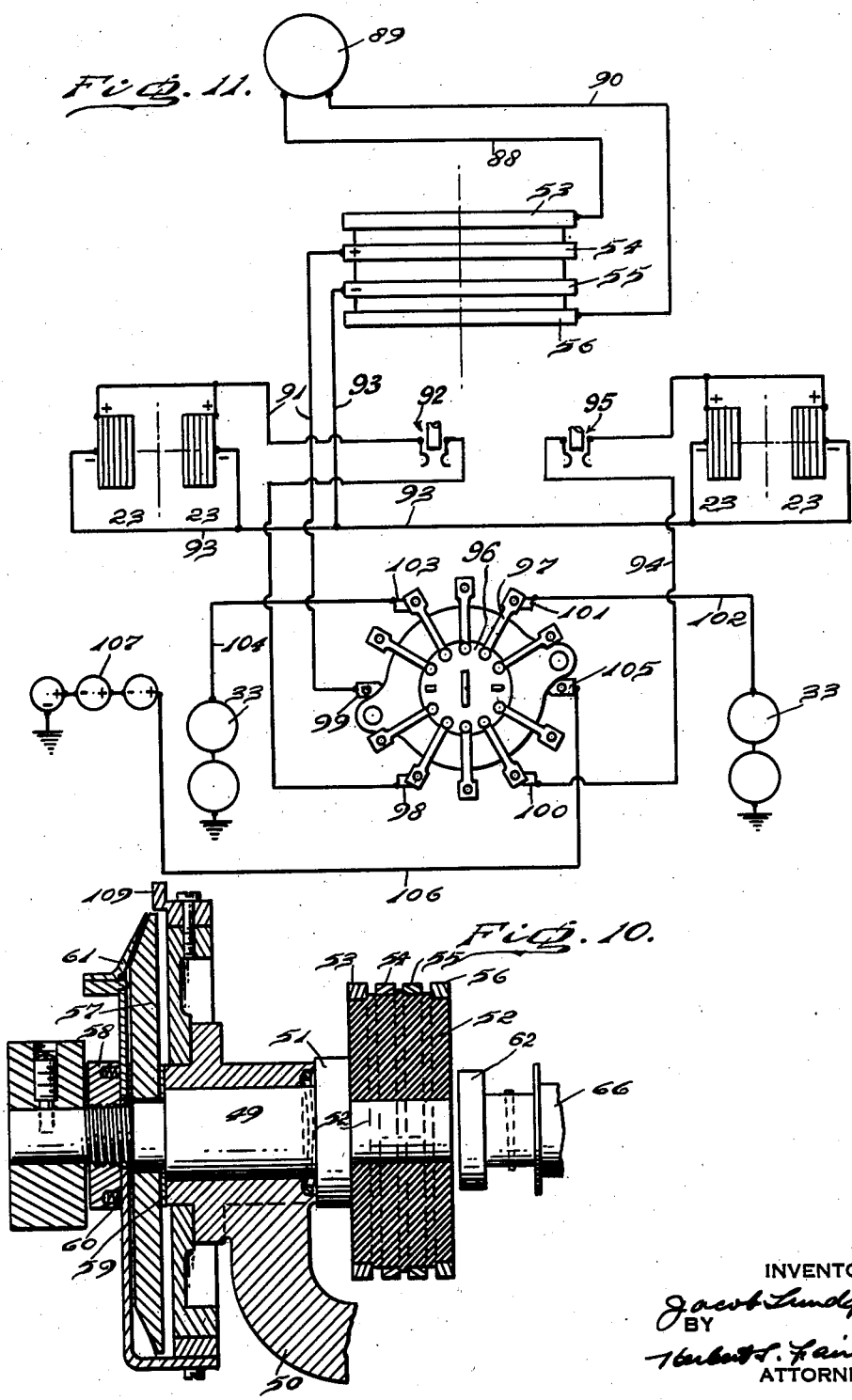
INVENTOR
Jacob Lundgren
BY
Herbert J. Fairbanks
ATTORNEY Patented July 7, 1942

2,289,200

UNITED STATES PATENT OFFICE 2,289,200

APPARATUS FOR BALANCING ROTATABLE BODIES

Jacob Lundgren, Philadelphia, Pa., assignor to Tinius Olsen Testing Machine Company, Philadelphia, Pa., a corporation of Pennsylvania Application September 1, 1939, Serial No. 293,042

3 Claims. (Cl. 73—53)

One object of my present invention is to devise a novel apparatus for balancing, wherein the rotatable body to be tested for unbalance is substantially free to rotate in space by mounting it in floating bearings free to turn on a vibratory support, and wherein a fixed pivot can be established exterior of the body and its bearings for vibration of the body in a selected plane of rotation without preventing the free oscillatory movements of the bearings due to unbalanced forces in the rotating body.

A further object of the invention is to devise novel means for establishing a selected fixed pivot of the character specified, and a novel controlling and indicating system for indicating the magnitude of unbalance and the phase angle of unbalance in a selected plane of correction of the rotatable body being tested.

With the above and other objects in view as will hereinafter clearly appear, my invention comprehends a novel apparatus for balancing rotatable bodies.

It further comprehends a novel construction and arrangement of a balancing machine having novel means for generating a voltage proportional to vibration due to unbalanced forces in a selected plane of correction of the body; novel means for establishing a fixed pivot of vibration exterior of the body and its mounting without preventing the free oscillation of bearings on which the rotatable body is mounted, and novel means for indicating the magnitude and phase angle of the unbalance.

It further comprehends a novel and simplified electrical circuit, novel voltage generating means, and novel clamping means.

Other novel features of construction and advantage will hereinafter appear in the detailed description and the appended claims.

For the purpose of illustrating the invention, I have shown in the accompanying drawings a typical embodiment of it, which, in practice, will give satisfactory and reliable results. It is, however, to be understood that the various instrumentalities of which my invention consists can be variously arranged and organized and my invention is not limited to the exact arrangement and organization of these instrumentalities as herein set forth.

Figure 2 is a top plan view.

Figure 3 is an end elevation.

Figure 4 is a sectional elevation of an electromagnetic clamp for establishing a fixed pivot.

Figure 5 is a top plan view of the clamp in clamped condition with a member for establishing a fixed pivot of vibration.

Figure 6 is a sectional elevation showing in detail the mounting of a bearing and its connection with the voltage generating means and the pivot forming means.

Figure 7 is a top plan view of a journal.

Figure 8 is a sectional detail of securing means.

Figure 9 is a wiring diagram of the commutator and its adjuncts.

Figure 10 is a sectional elevation of the commutator and its adjuncts.

Figure 11 is a wiring diagram of the different electric circuits.

Figure 12 is a sectional elevation of a bearing and cooperating shaft.

Similar numerals indicate corresponding parts.

Figure 1:
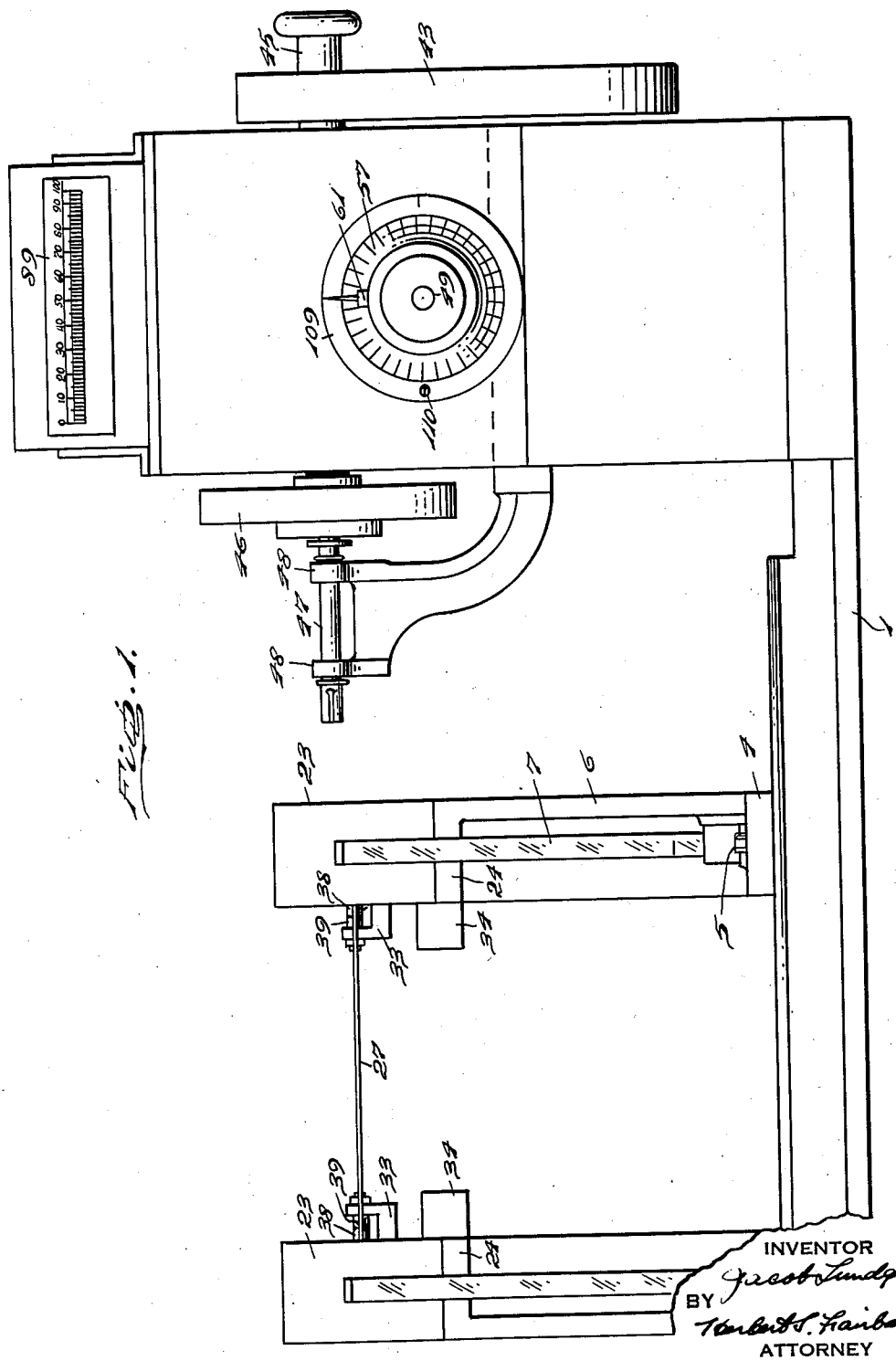
Figure 1 is a front elevation, partly broken away, of a balancing machine embodying my invention.

Referring to the drawings:

1 designates the base or supporting frame work having longitudinally extending inverted T shaped slots 2 to receive shoes 3, see Figure 3, which extend through cross bars 4 and are secured in position by fastening devices 5. Recessed columns 6 have the lower ends of vibration members 7, in the form of a pair of flat springs fixed to them. The upper ends of the springs, see Figure 6, are fixed to journals 8, recessed at their upper ends to receive a ball bearing 9 which carries a head 10 fixed to a bearing 11 by screws 12 which pass into segmental slots 13, see Figure 7, in journals 8.

The head 10 has a rod 14 provided with a bearing 15 and a nut 16 so that each bearing is mounted on anti-friction devices and is free for limited turning movement. The bearings 11 are recessed as at 17 in their top face to receive a rotatable body, the unbalance of which is to be determined.

Each journal member 8 is connected with means to generate an A. C. voltage, and as illustrated, links 18 are secured at their front ends to journal members 8 and at their rear ends to a link 19 which embraces a magnet 20 supported on springs 21. 22 are the windings of a generator and are in a generator casing 23 supported on a bracket 24 carried by a cross bar 4. The generator casing 23 is slotted for the link 19 to pass therethrough. The links 19 at their rear ends are fixed to angle brackets 25 secured by an anti-friction fastening device 26 to a member 27 for establishing a fixed pivot of vibration. The member 27 has longitudinally spaced apertures 28 to provide for fixing a clamping arm 40 in position by means of a securing device 29 similar in construction to 26.

The fastening devices 26 and 29 are of the same construction. The fastening device 29, for example, consists of an angle 30, see Figure 8, fixed to a clamping arm 40, and having an upper and a lower ball bearing 31 and a thumb screw 32 passing through the part to be clamped and in threaded engagement with a nut.

The clamping of the arms 40 is by the solenoids 33, see Figures 4 and 5, which are on plates 34, see Figure 6, having slots 35 and bolts 36 whereby the solenoids are fixed in their adjusted position longitudinally of the member 27.

Each solenoid 33, see Figures 4 and 5, has a spring pressed armature 37 having a clamping head 38 between which and an adjustable stop 39, the arm 40 is clamped to establish a fixed pivot for vibratory movement of the rotatable body.

The base 1 has mounted on it a motor 41 which drives a pulley 42 and thereby a belt 43 which drives a pulley 44 on a drive shaft 45 journalled in the machine frame.

The shaft 45 has an angle index 46 and is coupled to a shaft 47 having clearance in its bearing 48 to provide for free oscillation of the body to be tested which is coupled in any desired or conventional manner with the shaft 47 so that the body will be rotated without preventing its free oscillatory movement with its bearings.

The magnitude and phase angle of the unbalance is determined by circuit controlling mechanism similar to that shown in my copending application Serial No. 150,965, filed June 29, 1937, Patent No. 2,228,011, and will now be described.

A commutator shaft 49, see Figure 10, is mounted in a bracket 50 carried by the machine frame and has a collar 51 and a reduced extension on which is mounted a block 52 of insulating material, carrying spaced rings 53, 54, 55 and 56 cooperating with suitable brushes. The shaft 49 has a graduated dial 57 retained on it by a locking nut 58 against a thrust washer 59. Spring pressed friction plugs 60 bear against a shifter hand 61 loosely mounted on the commutator shaft.

The insulator block 52 has mounted on it two switch mechanisms A and B disposed 180° apart, each of the same construction and controlled by a cam 62 having operative cam faces 63 and dwells 64 and 65. The cam is mounted on a shaft 66 driven in definite speed relationship with that of the body being tested in the balancing machine.

Each switch mechanism has two sets of contacts, one of which is closed when the other is open to provide for the quick reversal of the circuits.

The switch mechanism A has an adjustable stationary contact 67 which cooperates with a movable contact 68 on a contact carrying spring arm 69 fixed at one end to a post 70 and having one end of a spring 71 connected with it, the other end of said spring being secured to a fixed part of the block 52. The post 70 is electrically connected with the commutator ring 54 by line 111. The stationary contact 67 is electrically connected with the commutator ring 56 by a line 112. The contact carrying arm 69 is a straight arm and carries a second contact 114 which cooperates with a contact 113 at the rearwardly deflected end of a contact carrying spring arm 115 fixed at one end to a post 72 on the insulating block 52. One end of a spring 73 is connected with the contact carrying arm 115 and its opposite end is fixed to the block 52. The post 72 is electrically connected with the commutator ring 53 by lines 116 and 74. The contact carrying arm 115 has a pressure member 75 which rides on the periphery of the cam 62.

The switch mechanism B has an adjustable stationary contact 76 which cooperates with a contact 77 on a contact carrying spring arm 78 fulcrumed on a post 86 on the block. The contact 76 is electrically connected with the commutator ring 56 by the line 112. The arm 78 also carries a contact 79 which cooperates with a contact 80 on the rearwardly deflected end of a spring contact carrying arm 81 fulcrumed on a post 82 on the insulating block. The arm 81 has one end of a spring 83 connected to it, the other end of said spring being connected to a fixed part of the block 52. The arm 81 has a cam contacting member 108. The post 82 is electrically connected with the commutator ring 53 by the line 74.

The arm 78 has one end of a spring 85 connected to it, the other end of said spring being connected to a fixed part of the block 52. The post 86 is electrically connected with the commutator ring 55 by a line 87.

The ring 53, see Figures 10 and 11, is connected by line 88 with a meter 89, which as illustrated, is a D. C. meter, and a line 90 connects the meter with the ring 56.

The left hand pick-up 23, see Fig. 9, is connected by line 91 having manually operated switch 92 with the ring 54.

The ring 55 is connected by line 93 with both pick-ups.

The right hand pick-up 23 is connected by line 94 having a manually operated switch 95 with line 91 and thereby with ring 54. The rings 54 and 55 act as collecting rings and the rings 53 and 56 are connected with the rectifying means.

In Figure 11, a one stage, two circuit switch 96 is shown having contact arms 97 cooperating with contacts 98 and 99 of line 91, contact 100 of line 94, contact 101 leading by line 102 to the right end solenoid, contact 103 leading by line 104 to the left end solenoid, and contact 105 connected by line 106 with a battery or rectifier 107. The switch 96 may be mounted on the machine frame at any convenient location.

The commutator has a stationary index 109 with a stop 10 which is 90° from the top of the stationary dial.

The operation will now be apparent to those skilled in the art and is as follows:

The rotatable body to be tested is placed on the bearings 11 and coupled in any desired or conventional manner with the shaft 47.

Assuming now that the unbalance is to be determined at the left end plane of correction, the motor circuit is closed and the switch 96 is turned to close the circuit through contacts 98 and 99 and contacts 105 and 101. The current passes from battery 107, line 106, contact 105, contact 101 and line 102 to the electromagnet or solenoid 33 at the right end to energize it and cause it to clamp the clamping member 40 which has been locked in a selected plane by the right end fastening device 29. This established a fixed pivot for the vibratory movement of the rotatable body at the selected left plane of correction without preventing the free oscillations of each bearing 8 on which the rotatable body is mounted. Each bearing 8 is rotatably mounted on ball bearings 10 and 15 and has limited turning or swinging movement due to the provision of parts 12 and slots 13, see Figures 6 and 7.

The electric pick-up 23 at the left end generates an A. C. voltage proportional to the vibration in the selected left end plane of correction due to unbalanced forces in the body.

The A. C. current generated at the left end pick-up passes, see also Figure 9, by line 91, contact 98, arms 97, contact 99, line 91 to ring 54 which acts as a collector ring. The current then passes by line 111, post 70, contact arm 69, and, since contacts 67 and 68 are open and contacts 114 and 113 closed, the current passed by lines 116 and 74 to ring 53 and by line 88 to meter 89. The meter 89 is connected by line 90 with ring 56 and line 112 with stationary contacts 76 and 67.

The commutator rectifies the A. C. current generated to a pulsating uni-directional or D. C. current, and reverses the direction of the current at half cycle intervals.

The operator turns the commutator shaft 49 counterclockwise until the meter 89 registers zero. The shifting hand 61 and dial move together with the shaft 49 unless the hand is arrested by the stop 110.

If at the zero position the shifter hand does not strike the left end stop, then the shifter hand is moved down to such stop. The shaft 49 is then turned clockwise to the twelve o'clock position, and, since at this time the amplitude of the meter is the greatest, the magnitude or amount of unbalance is indicated. The commutator setting which gives zero meter reading with the meter pointer moving in the same direction as the commutator is turned indicates the angle of unbalance. The alternating current created is proportional to the vibration created by the unbalanced forces and thus proportional to the unbalance to be measured. The phase relation of this alternating current to the rotation of the part being balanced indicates the angle of unbalance. To locate the unbalance angle on the body being balanced the shaft 45 is turned until the angle index 46 indicates the same angle as is indicated by the pointer. The pointer indicates the angle of unbalance and also shows when the operator has turned the commutator exactly 90°.

The switch 96 is a conventional one stage, two circuit, selector switch arranged so that for a left end coil contacts 99 and 98 and contacts 105 and 101 are electrically connected and for a right end coil contacts 99 and 100 and contacts 105 and 103 are electrically connected.

The switch position for a right end plane of correction is when the circuit is closed through contacts 100, and 99, and the circuit closed through contacts 105 and 103. The left end solenoid 33 establishes the left end pivot of vibration. The current passes from the battery 107 by line 106, contact 105, switch 96, contact 103, line 104 to energize the left end solenoid 33. The generated voltage passes by line 91 to collector ring 54. The current is rectified in the manner already described by the commutator and the magnitude or amount of unbalance is indicated on the meter and the angle on the angle indicator.

If the unbalance in the left end plane of correction is being determined it will be clear that as the cam 62 revolves, contacts 113 and 114 will open and contacts 67 and 68 will close so that as one set opens the other set closes. The A. C. current from the left pick-up 23 passes by line 91, collector ring 54, line 111, post 70, arm 69, contact 68, contact 67, line 112, to ring 56 and meter 89 so that the direction of the voltage passing to the meter is reversed at half cycle intervals to form a unidirectional voltage.

The circuits for a right end plane of correction can readily be followed in Figures 9 and 11 in a similar manner to that already described from the source of supply for the left end solenoid and the right end pick-up.

It will be clear from the foregoing that I establish a fixed pivot, for vibratory movement of the rotatable body due to its unbalanced forces, which is exterior of the planes of the body and its mounting, since it is on the bar 27. This does not prevent the free vibration of the bearings 8 on which the body to be balanced is mounted.

The voltage generated is proportional to the unbalance in a selected plane of correction.

The cam faces 63 on the cam 62 are spaced 180° apart.

Due to the construction of the commutator, the reversal of the voltage can take place at any point in the circumference of a circle.

Having thus described my invention, what I claim as new and desire to secure by Letters Patent is:

1. In a balancing machine, a frame, vibratory bearings for a rotatable body longitudinally adjustable on said frame, means to rotate a body on said bearings, voltage generators longitudinally adjustable on said frame and creating an A. C. voltage from vibrations caused by unbalanced forces in said body, a bar having its ends connected with movable parts of said voltage generators, pivot forming arms fixed in adjusted position on said bar to define two planes of correction, separate clamping means longitudinally adjustable along the frame to clamp a selected arm to form a selective fixed pivot for vibratory movements of said body, and means to determine from the generated voltage the phase angle and the amount of unbalance in said body.

2. In a balancing machine, vibratory bearings for a rotatable body free at all times to oscillate in planes at right angles to the axis of rotation of said body, means to rotate said body, electric generators to generate voltages proportional to vibration in two selected planes of said body, and having movable parts connected with said bearings, a member spaced from, extending longitudinally of said body and connected with said movable parts, and two separate means to establish selectively in two selected planes of said body a fixed pivot for the member, without preventing the free vibratory movements of said bearings in planes at right angles to the axis of rotation of said body.

3. In a balancing machine, vibratory journals, bearings for a rotatable body mounted for limited rotation on said journals, means to rotate said body, said bearings being free at all times to oscillate due to unbalanced forces in said body in planes at right angles to the axis of rotation of said body, electric generators to generate voltages in selected planes of said body and having movable parts connected with said journals, a member connected with said movable parts, two separate means to selectively establish in two selected planes of the body a fixed pivot for said member without preventing the free vibratory movements of said journals in planes at right angles to the axis of rotation of said body, and means to determine from the generated voltage the amount and the phase angle of the unbalance in said body.

JACOB LUNDGREN.